United States Patent [19]
Morrison

[11] Patent Number: 5,820,256
[45] Date of Patent: Oct. 13, 1998

[54] MOTORLESS MIXER

[75] Inventor: Ralph Morrison, Bradley, Ill.

[73] Assignee: Stranco, Inc., Bradley, Ill.

[21] Appl. No.: 657,655

[22] Filed: May 30, 1996

Related U.S. Application Data

[60] Provisional application No. 60/000,102 Jun. 9, 1995.
[51] Int. Cl.$^6$ ...................................................... B01F 5/04
[52] U.S. Cl. .................................. 366/162.4; 366/167.1; 366/173.1; 366/341
[58] Field of Search ............................. 366/150.1, 160.1, 366/162.1, 162.4, 162.5, 163.1, 163.2, 167.1, 167.2, 173.1, 173.2, 176.1, 176.4, 181.8, 181.7, 182.1, 182.3, 182.4, 341

[56] References Cited

U.S. PATENT DOCUMENTS

| | | | |
|---|---|---|---|
| 1,496,345 | 6/1924 | Lichtenthaeler | 366/173.1 |
| 2,768,123 | 10/1956 | Trusty et al. | 366/162.4 |
| 3,332,442 | 7/1967 | Reed | 366/167.1 |
| 3,818,938 | 6/1974 | Carson | 366/167.1 |
| 4,274,749 | 6/1981 | Lake et al. | 366/341 |
| 4,505,591 | 3/1985 | Day et al. | 366/162.1 |
| 4,549,813 | 10/1985 | Volz et al. | 366/167.1 |

*Primary Examiner*—Tony G. Soohoo
*Attorney, Agent, or Firm*—McHale & Slavin

[57] ABSTRACT

An apparatus for uniformly mixing two or more liquids. The apparatus includes a water inlet having a flow orifice for controlling flow rate and pattern. A second fluid to be mixed with the water is injected downstream of the water orifice an opposite direction resulting in a high energy contact to insure uniform wetting/mixing of the fluids. The mixture is directed through a chamber having a spacial aspect to insure uniform mixture before placement into a secondary chamber having multiple distribution points to assist in diluting the mixture into an additional fluid before directing the fluid to its point of use.

11 Claims, 2 Drawing Sheets

MOTORLESS MIXER

FIELD OF THE INVENTION

This invention relates to mixing of fluids and, more particularly, to a polymer mixer relying upon kinetic energy.

BACKGROUND OF THE INVENTION

The application is a conversion from Provisional Patent filed Jun. 9, 1995 having Ser. No. 60/000102.

Known "static" mixers are a series of baffles positioned to cause turbulent flow. This turbulence is used for mixing energy. As the flow, or velocity, is decreased, as required by the application, the turbulence also decreases, which reduces the effectiveness of the apparatus. Most known static mixers have external flow and/or velocity controls in the form of regulating valves. The flow control valve has an adjustable orifice, as the orifice area is reduced, the flow is also reduced. The velocity through the orifice is higher than the velocity in the supply line, as well as in the known static mixing apparatus.

Known static mixers used on polymer and water solutions inject the polymer in a "slug feed" manner. This will cause the outside of the polymer "slug" to be exposed to the water, however, the inside of the "slug" will not get exposed to the water until the exposed outer surface is removed and eventually the water erodes its way into the entire slug. This may or may not happen in a timely enough fashion for the polymer to be useful. This can create an inefficient use of chemical.

Polymers are high molecular-weight materials used, among other things, as an aid in removing suspending particles from water, for dewatering sludges, and for other liquid/solid separation applications. The polymers are tightly tangled before activation, and extend or untangle when fully activated in dilution water. Thus, the degree to which a polymer facilitates coagulation and flocculation is improved with greater polymer activation. In commercial applications, it is important that polymers be diluted and activated as quickly and completely as possible without damaging the polymer molecules. Hence, mixing of such fluid polymers with a dilutant is an important consideration.

Multi-stage mixing has been proposed in U.S. Pat. No. 5,316,031 wherein polymer molecules are subjected to relatively high shear forces for a short period of time in a first processing zone, followed by lower shear forces for a longer period of time in a second processing zone. However, in prior disclosures the shearing forces were substantially constant within each processing zone. Hence, further improvements were proposed by '031 in the form of multi-stage mixers with a post-dilution static mixing apparatus.

Such improvements call for a first zone which subjects the polymer molecules to relatively high shear conditions through the use of a high speed impeller. A second zone includes a plurality of concentric baffles which divide the processing area into annular concentric spaces. These baffles continue to swirl the fluid with the direction of travel reversing as the fluid enters each new annular space. The swirling action decreases because there is no impelling action in the second zone.

The third zone adds a static mixer. Known static mixers typically include a series of baffles positioned to cause turbulent flow in a polymer fluid. This turbulence is used as mixing energy to activate the polymers and mix them with the dilutant. If the fluid flow or velocity is decreased, as required for any particular application, the turbulence also decreases. This reduces the effectiveness of the mixing and hence the effectiveness of the apparatus.

Thus, there is a need for a motorless mixing apparatus which can efficiently facilitate the mixing of fluids, in particular a polymer with a dilutant, so as to activate but not damage the polymer molecules.

SUMMARY OF THE INVENTION

The instant invention is a mixer for uniform mixing of two or more liquids, without the use of motors or other additional mechanical agitation, by use of the kinetic energy, i.e. the velocity, available in the two liquids to be mixed. One objective of the invention is to include the rate control as part of the mixing apparatus, to allow use of the high velocity generated through the flow controlling orifice. A second objective is to maintain an increased velocity to aid in the mixing capability through a second lower energy zone, without the use of baffles.

The primary use for the mixer will be for diluting and activating polymer molecules with water for wastewater treatment. The benefit is more efficient use of available resources, i.e. the available fluid velocity, and none of the problems associated with mechanical agitators: bearings, shaft seals, and drive mechanisms. A third objective of the invention is to introduce the polymer to the water in circular fine "spray" to insure an efficient use of chemical and prevent the agglomeration caused by "slug" feeding.

The present invention teaches a kinetic energy mixer for uniformly mixing two or more liquids which operates without the use of motors or other additional mechanical agitation. As applied, the velocity of the liquids themselves supply the mixing energy needed. By strategically injecting pressurized fluids so that they forcibly interact, mixing occurs through the turbulent interaction of the fluids. The present invention also utilizes a nozzle to introduce the fluid polymer as a fine circular spray with the dilutant water, to thereby further facilitate mixing of the two fluids. The fluids are then translated down a corridor, or shaft, whose sides frictionally interact with the passing fluids. This interaction further serves to stir up the passing fluids, but without the use of complicated baffles or annularized compartments.

One benefit of the present invention includes the more efficient use of available resources, i.e. the available fluid velocity. Another benefit is the lack of mechanical agitators in that the present invention will have none of the problems associated with such moving parts as bearings, shaft seals, and drive mechanisms. Additionally, the present invention achieves efficient mixing without the use of complex fluid corridors and associated baffles. The complex shapes of such baffles can lead to fouling which is hard to clean, and such barriers impede the efficient flow of fluid through the device, thereby limiting its treatment capabilities.

Accordingly, it is an objective of the present invention to provide a mixing apparatus which uses the energetic velocity of incoming fluids to turbulently mix and activate the fluids without the use of mechanical means.

It is a related objective of the present invention to provide a mixing apparatus which maintains an increased velocity to aid in the mixing capability through a second lower energy zone without the use of baffles, such zone using the frictional sides of a fluid passage corridor to further mix the passing fluids.

It is still a further objective of the present invention to provide a mixing apparatus which includes rate control of the fluid as part of the mixing apparatus, to allow controllable use of the high velocity generated through the flow controlling orifice.

It is yet another objective of the present invention to provide a mixing apparatus which introduces the fluid polymer to the dilutant water in circular fine "spray" to insure an efficient use of chemical and prevent the agglomeration caused by "slug" feeding.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

DETAILED DESCRIPTION OF THE PREFERRED EMBODIMENT

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1:
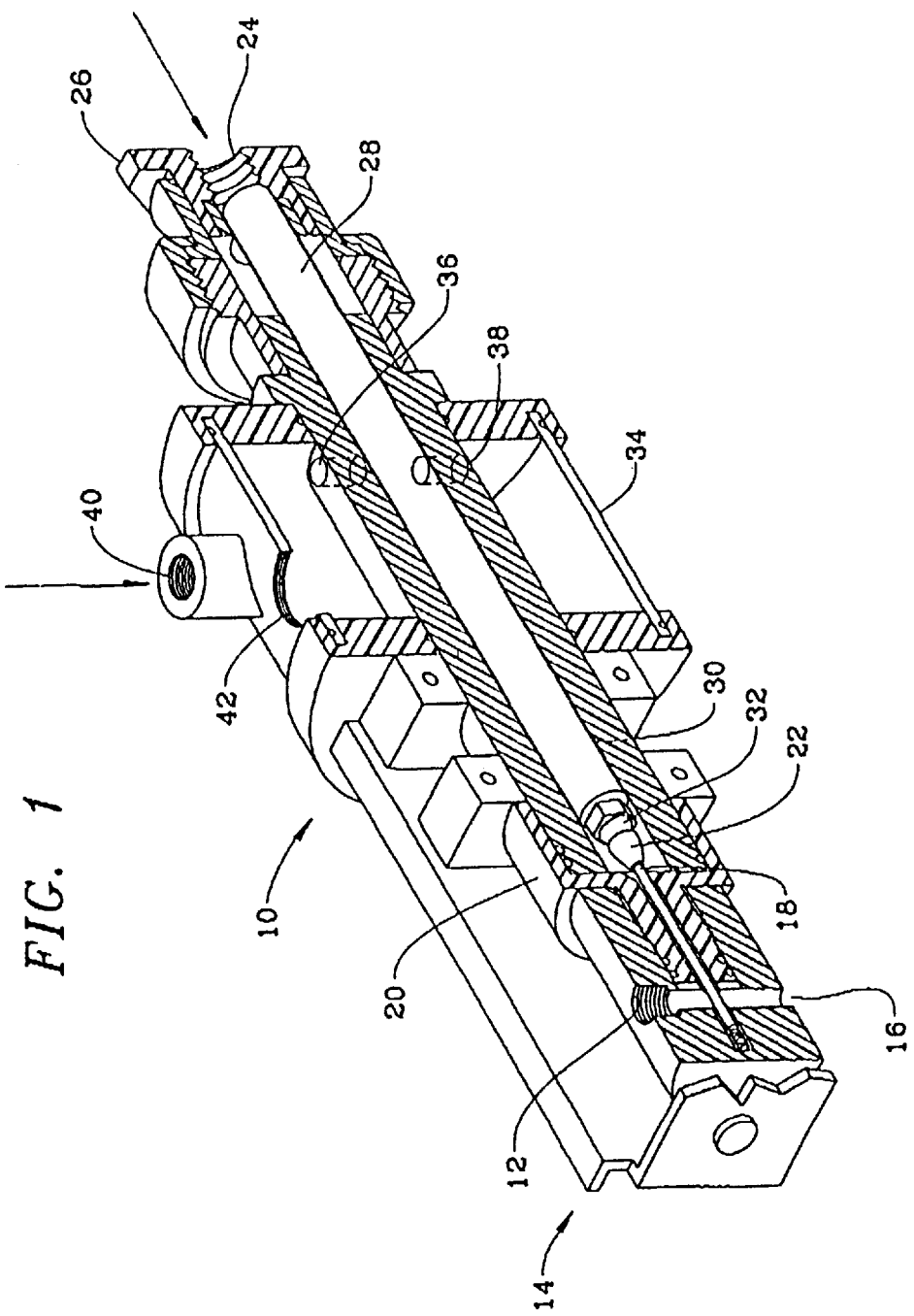
FIG. 1 shows a pictorial, cross-sectional view of the motorless mixer of the instant invention.

Referring now to FIG. 1, by way of operation, water enters the apparatus 10 through primary inlet port 12 adjacent first end 14. Gauge port 16 allows attachment of a pressure gauge, not shown, for determining of the water pressure of the primary dilution water pressure at the primary inlet port 12. The flow of the water is directed through a controlled orifice 18, the size of the orifice made variable by turning orifice control knob 20 to control the flow rate and fluid velocity by causing the conically shaped valve 22 to advance or retreat in relation to the orifice 18. Orifice 18 and conically shaped valve 22 form a variable orifice which is designed to give a primary dilution water stream of relatively high velocity in a circular flow pattern.

A second fluid enters the apparatus through fluid inlet port 24 through end 26 and is directed through an fluid carrier tube 28 which extends approximately the length of chamber 30 formed in the casing. The second fluid is injected into the high velocity stream of primary dilution water through a circular poppet-type check valve 32. The poppet valve 32 allows a fine spray injection for introduction of fluid into the stream in a similar circular pattern.

The primary dilution water and the second fluid are traveling in opposite directions until they are introduced. This type of high energy initial contact insures uniform wetting or mixing of the two fluids. The solution is now directed along interior chamber 30 having a relatively small open area but a relatively large amount of surface area. This will insure a high velocity through the interior chamber 30 with substantial surface friction created between the surface of the fluid carrier tube 28 and the inner surface of interior chamber 30. Accordingly, this makes use of the turbulence created by the frictional drag between the fluids and the tube surfaces which further assists in the mixing apparatus performance.

The solution is directed into a comparatively larger circularly-shaped secondary dilution chamber 34 through four identical ports, two of which 36 and 38 are illustrated. This serves to evenly distribute the solution through the dilution chamber 34 and allows mixing with secondary dilution water, that may be required by the application, and secondary dilution will be added from a tangential inlet port 40. The solution is introduced at four evenly distributed points to prevent "tunneling", and to assist in a uniform solution mixture. The velocity of the additional water being added on tangeant is also being utilized to assist in the mixing performance of the apparatus 10. The mixed solution then exits through port 42 to its intended point of use.

Figure 2:
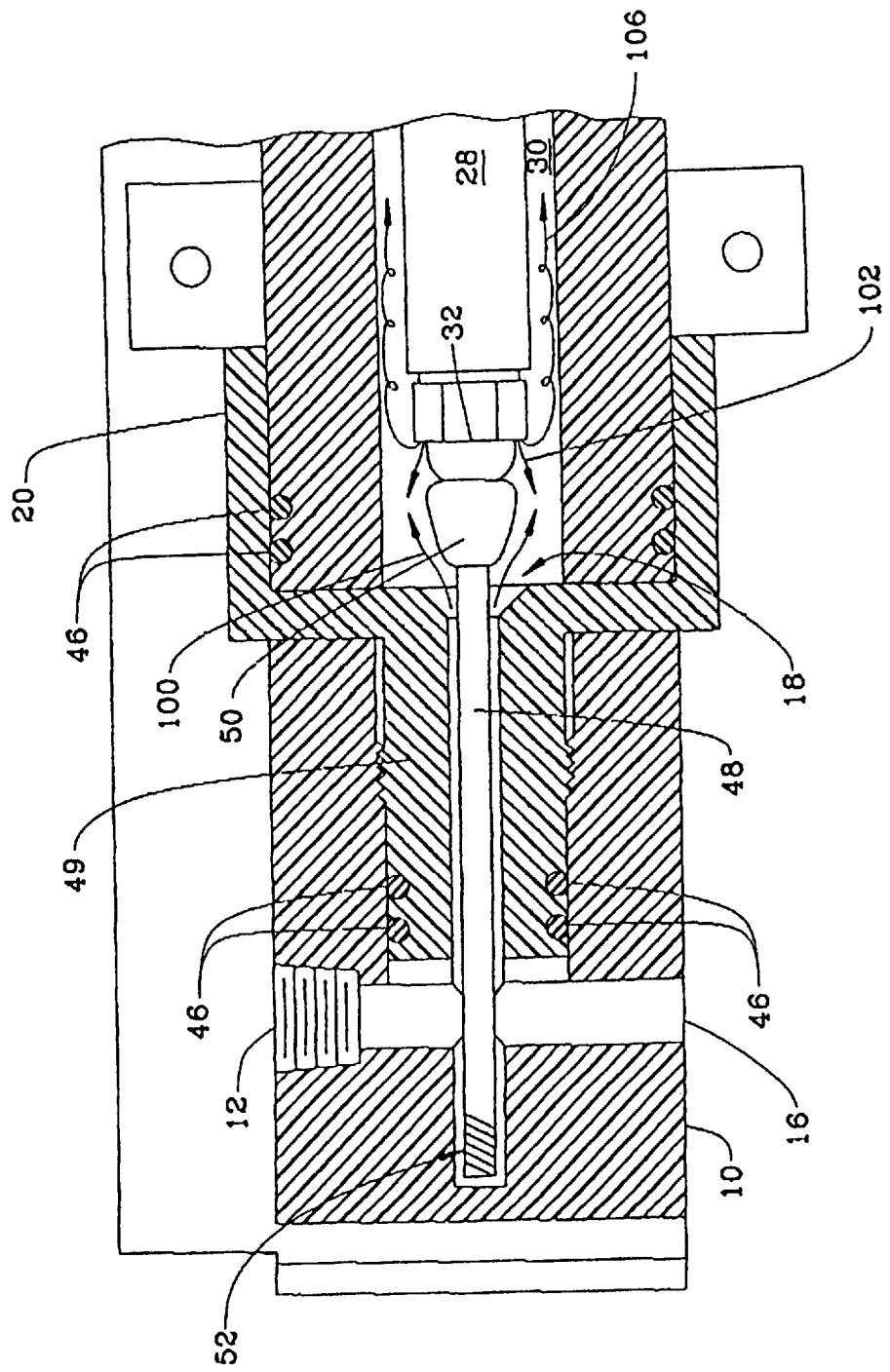
FIG. 2 shows a side view of one end of the motorless mixer which includes the adjustable fluid orifice and interacting high velocity check valve.

Referring now to FIG. 2, a detailed cross sectional side view is depicted of primary inlet port 12 and controlled orifice 18. The orifice control knob 20 is rotatable with sealing effected by O-rings 46. Rotation of knob 20 having partially illustrated threaded engagement section 49 displaces controlled orifice valve 48 along the longitudinal length. The orifice valve having a first conical end 50 which is secured into the casing at the end 52, the rotation of the knob 20 advances and retracts the conical end in relation to the orifice opening 18. The interaction of the tapered sides and the conical end produces a circular flow which sprays outward as indicated by arrows 100. The secondary inlet tube 28 conveys fluid, e.g. polymers, in the opposite direction. The tube 28 terminates in a circular poppet-type check valve 30 which is capable of producing a fine circular spray as indicated by arrows 102. The velocity of the two fluids interacting in interior chamber 30 further operates as a mixing channel to produce a highly efficient turbulent mixing of the fluids and subsequent activation of the polymers. The turbulent fluids as indicated by arrows 106 then flow along chamber 30. As previously mentioned, the surface area of the chamber 30 is an element that contributes to the mixing of the fluids before discharge.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A motorless, kinetic energy fluid mixing apparatus comprising: an elongated housing having a first end and a second end forming a first interior chamber therebetween; a primary inlet port fluidly coupled to said first interior chamber adjacent to said first end of said housing; means for controlling water velocity between said primary inlet port and said first interior chamber; a fluid inlet port formed adjacent to said second end of said housing, said fluid inlet port coupled to a fluid carrier tube positioned within said first interior chamber with a discharge end positioned at said first end of said first interior chamber, said fluid carrier tube having an outer surface with a diameter less than the diameter of an inner surface of said interior chamber;

a secondary dilution chamber operatively associated with said first interior chamber having a second inlet port for introducing water into said secondary dilution chamber for triplicate mixing of the solution, and an outlet port for discharge;

wherein water injected through said primary inlet port admixes with fluid injected through said fluid inlet port into a solution along said discharge end of said carrier tube providing a primary mixing whereby frictional passing of said solution in said first interior chamber along said outer surface of said carrier tube provides a secondary mixing of the solution and passage of said solution into said secondary dilution chamber provides a third mixing before discharge.

2. The fluid mixing apparatus according to claim 1 including a second water inlet for dilution of solution in said secondary dilution chamber.

3. The fluid mixing apparatus according to claim 1, wherein said means for controlling water velocity is further defined as a valve plug in relative adjustment into an orifice.

4. The fluid mixing apparatus according to claim 3 wherein said orifice is conically shaped for producing a circularly shaped injection water pattern.

5. The fluid mixing apparatus according to claim 1, wherein said discharge end of said carrier tube includes a poppet-type check valve for producing a fine circular spray of said fluid.

6. A motorless, kinetic energy fluid mixing apparatus comprising: an elongated housing having a first end and a second end forming a first interior chamber therebetween; a primary inlet port fluidly coupled to said first interior chamber adjacent to said first end of said housing; means for controlling water velocity between said primary inlet and said first interior chamber; a fluid inlet port formed adjacent to said second end of said housing, said fluid port coupled to a fluid carrier tube positioned within said first interior chamber with a discharge end positioned at said first end of said interior chamber, said fluid carrier tube having an outer surface with a diameter less than the diameter of an inner surface of said interior chamber; a secondary dilution chamber operatively associated with said first interior chamber, said secondary dilution chamber having a plurality of equally spaced ports providing equal fluid communication between said first interior chamber and said secondary dilution chamber; and an outlet port for discharging mixed fluid;

wherein water injected through said primary inlet port admixes with fluid injected through said fluid inlet port into a solution along said discharge end of said carrier tube providing a primary mixing whereby frictional passing of said solution in said interior chamber along said outer surface of said carrier tube provides a secondary mixing of the solution and passage of said solution into said secondary dilution chamber provides a third mixing before discharge.

7. The fluid mixing apparatus according to claim 6 wherein said secondary dilution chamber includes an inlet opening for dilution of solution in said secondary dilution chamber.

8. The fluid mixing apparatus according to claim 6, wherein said means for controlling water velocity is further defined as a valve plug in relative adjustment into an orifice.

9. The fluid mixing apparatus according to claim 8, wherein said orifice is conically shaped for producing a circularly shaped injection water pattern.

10. The fluid mixing apparatus according to claim 6, wherein said discharge end of said carrier tube includes a poppet-type check valve for producing a fine circular spray of said fluid.

11. The fluid mixing apparatus according to claim 6, wherein said carrier tube is slidably insertable in said first interior chamber.

\* \* \* \* \*